United States Patent
Winzell et al.

(10) Patent No.: US 10,109,042 B2
(45) Date of Patent: Oct. 23, 2018

(54) METHOD AND APPARATUS FOR ENHANCING LOCAL CONTRAST IN A THERMAL IMAGE

(71) Applicant: AXIS AB, Lund (SE)

(72) Inventors: Thomas Winzell, Flyinge (SE); Emanuel Johansson, Lund (SE); Mats Bylander, Sodra Sandby (SE); Jesper Bengtsson, Helsingborg (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/259,403

(22) Filed: Sep. 8, 2016

(65) Prior Publication Data
US 2017/0069069 A1   Mar. 9, 2017

(30) Foreign Application Priority Data

Sep. 8, 2015 (EP) .................................... 15184252

(51) Int. Cl.
*G06T 5/40* (2006.01)
*H04N 5/33* (2006.01)
(Continued)

(52) U.S. Cl.
CPC ............. *G06T 5/40* (2013.01); *G06T 5/008* (2013.01); *H04N 5/2355* (2013.01); *H04N 5/33* (2013.01);
(Continued)

(58) Field of Classification Search
None
See application file for complete search history.

(56) References Cited

U.S. PATENT DOCUMENTS

| 5,249,241 | A | | 9/1993 | Silverman et al. |
| 5,724,456 | A | * | 3/1998 | Boyack .............. G06T 5/009 345/428 |

(Continued)

FOREIGN PATENT DOCUMENTS

| EP | 0363209 A2 | 4/1990 |
| JP | 2013-024671 A | 4/2013 |

(Continued)

OTHER PUBLICATIONS

European Search Report for European Application No. 15184252.3 dated Jan. 28, 2016.

(Continued)

*Primary Examiner* — Kim Vu
*Assistant Examiner* — Nathan Bloom
(74) *Attorney, Agent, or Firm* — Volpe and Koenig, P.C.

(57) ABSTRACT

A method for increasing enhancing local contrast in a thermal image for a class of objects having a thermal characteristic is provided. The method including providing thermal image data representing a first thermal image, where the first thermal image is acquired by an absolute calibrated thermal imaging system, redistributing the thermal image data having a first intensity distribution into a second intensity distribution using a predetermined redistribution function, where the predetermined redistribution function is based on the thermal characteristic, such that the local contrast is enhanced for the class of objects, outputting the redistributed thermal image data as the thermal image. An apparatus for enhancing local contrast in a thermal image for a class of objects having a thermal characteristic is further provided.

18 Claims, 3 Drawing Sheets

(51) Int. Cl.
*G06T 5/00* (2006.01)
*H04N 5/235* (2006.01)
*H04N 5/232* (2006.01)

(52) U.S. Cl.
CPC .............. *G06T 2207/10048* (2013.01); *H04N 5/23229* (2013.01)

(56) References Cited

U.S. PATENT DOCUMENTS

| | | | | |
|---|---|---|---|---|
| 2004/0183918 A1* | 9/2004 | Squilla | ............... | G06T 5/001 348/211.2 |
| 2007/0058862 A1* | 3/2007 | Meier | ............... | G06T 5/008 382/170 |
| 2007/0172145 A1* | 7/2007 | Altunbasak | ............... | G06T 5/009 382/274 |
| 2007/0188623 A1* | 8/2007 | Yamashita | ............... | G06T 5/004 348/222.1 |
| 2009/0290807 A1* | 11/2009 | Marchesotti | ............... | H04N 5/57 382/261 |
| 2013/0321637 A1* | 12/2013 | Frank | ............... | H04N 5/33 348/152 |
| 2014/0168439 A1 | 6/2014 | Frank et al. | | |
| 2014/0218520 A1* | 8/2014 | Teich | ............... | H04N 5/2354 348/143 |
| 2015/0358560 A1* | 12/2015 | Boulanger | ............. | H04N 5/332 348/164 |
| 2016/0379346 A1* | 12/2016 | Liu | ............... | G06T 5/009 382/169 |

FOREIGN PATENT DOCUMENTS

| | | |
|---|---|---|
| KR | 10-1339026 B1 | 12/2014 |
| WO | 2013052383 A1 | 4/2013 |
| WO | 2014100783 A1 | 6/2014 |

OTHER PUBLICATIONS

Security Electronics and Networks Articles, Road Test: Flir Systems FC-Series S Thermal, Aug. 20, 2013, pp. 1-9.
FLIR Technical Notes, "Digital Detail Enhancement (DDE)", 2 pages.
"Digital Enhancement of Night Vision and Thermal Images", Thesis of Chek Koon Teo, Naval Postgraduate School, Dec. 2003, pp. 1-93.

* cited by examiner

METHOD AND APPARATUS FOR ENHANCING LOCAL CONTRAST IN A THERMAL IMAGE

FIELD OF INVENTION

The invention relates to enhancement of local contrast in a thermal image.

BACKGROUND

It is known that all objects with a temperature above absolute zero emit thermal energy and that the intensity of the emission depends on the temperature of the object. In principle, the higher the temperature of the object, the greater is the intensity of the thermal emission from the object.

Thermal imaging systems utilize thermal sensors, such as micro-bolometers, to visualize heat differences within a scene by converting detected thermal energy into electrical energy to produce a thermal image or a thermal video of the scene. Hence, thermal imaging systems may, for example, provide thermal images in which a warm object such as a human stands out against a cooler background. Thermal imaging systems are, moreover, advantageous to use, compared to imaging systems utilizing visual light, as objects in a scene may be detected with or without illumination at the scene. Thermal imaging systems may further mitigate problems associated with complex light conditions such as when shadows or backlighting are present at the scene. Thermal imaging systems are thus frequently used in surveillance applications during day and night.

Detection and/or identification of an object of interest, such as a human, in a scene may, however, be problematic to achieve. A wide spread in temperatures for the objects within a scene may reduce the contrast such that it is difficult to distinguish an object of interest among other objects in a scene having similar thermal emission, e.g. if the object of interest has a similar temperature as that of its background.

A reduction of the dynamic range of the thermal data within the thermal imaging systems prior to displaying the thermal image may further reduce the detectability of the object of interest. Hence, there is a need for improved detection capability of thermal imaging systems.

SUMMARY

It is an object of the present invention to enhance local contrast in a thermal image for a class of objects. A method and an apparatus utilizing a thermal characteristic of a class of objects provide simple, efficient, and reliable enhancement of local contrast for the class of objects in the thermal image.

According to a first aspect of the invention this and other objects are achieved by providing a method for enhancing local contrast in a thermal image for a class of objects having a thermal characteristic, the method comprising: providing thermal image data acquired by an absolute calibrated thermal imaging system, redistributing the thermal image data having a first intensity distribution into a second intensity distribution using a predetermined redistribution function, wherein the predetermined redistribution function is based on the thermal characteristic, such that the local contrast is enhanced for the class of objects, outputting the redistributed thermal image data as the thermal image.

The intensity distribution of the thermal image data may by redistributing the thermal image data be modified such that the local contrast is enhanced for the class of objects having the thermal characteristic. The thermal image data may thereby be redistributed such that an intensity distribution is provided which emphasizes intensities pertaining to the thermal characteristic of the class of objects. In other words, by using the thermal characteristics for a given class of objects an increased detectability of the class of objects in the thermal image may be obtained.

An efficient method for enhancing local contrast in a thermal image is provided by using a predetermined redistribution function that is based on the thermal characteristic for the class of objects. A method which may be used in real time is further provided. The method may be used, for example, for a sequence of consecutive thermal images which may form part of a video sequence.

The use of an absolute calibrated thermal imaging system allows a given temperature of an object within a scene to be correlated to a given intensity within the thermal image data. In other words, a given temperature for an object translates to a given value or interval within the dynamic range of the thermal image data. A simple redistribution of the thermal image data may thereby be achieved.

The wording "thermal imaging system" should be understood as a system adapted to acquire thermal images. The thermal imaging system may, for example, comprise an apparatus for acquiring thermal images. The thermal imaging system may further comprise a display arranged to display thermal images. The apparatus for acquiring thermal images may be referred to as a thermal camera or an infrared camera.

The wording "contrast" should be understood as a difference in a color, e.g. in shades of a color such as a grayscale, or between parts of the color representation of the thermal image. The wording "local contrast" may further be understood as an intensity difference between different features within a given area of an image. The area may be the full thermal image or a sub portion of the thermal image.

The wording "thermal characteristic" should be construed as a distinguishing property or quality such that a given emission of thermal radiation pertaining to a class of objects. In other words, the thermal characteristic may be understood as a feature or signature that aids to distinguish a class of objects such as humans, animals or other types of objects in a thermal image.

The wording "redistribution function" should here be understood as a function which may be applied to thermal image data to modify the intensity distribution of the thermal image data. The thermal image data may thereby be redistributed to obtain a desired distribution. In other words, the redistribution function should be construed as a technique to modify the dynamic range and/or contrast of an image by altering its intensity values such that the image obtains a desired distribution.

The wording "calibrated" should further be understood as connecting detected intensity of thermal radiation to the temperature of a class of objects. The thermal imaging system may be absolute calibrated in at least a portion of a full temperature range and the portion may include the thermal characteristics of the class of objects. The entire temperature range of the thermal image system may alternatively be absolute calibrated.

The redistribution function may be arranged such that the local contrast is enhanced within a portion of the thermal image pertaining to the class of objects. The local contrast for the class of objects may further be enhanced such that an improved identification of features for the class of objects may be achieved.

The first intensity distribution may have a first dynamic range, wherein the redistributing further comprises altering the thermal image data such that the second intensity distribution has a second dynamic range smaller than the first dynamic range. The altering of the thermal image data may for example comprise straining, gaining, offsetting and/or shifting the thermal image data. The wording "dynamic range" should here be understood as the ratio between the largest and smallest possible values. The values may be represented in a pixel matrix of a thermal image. The values may represent levels of a changeable quantity such as a grayscale.

The altering of the thermal image data may be performed after the thermal image data have been redistributed. Loss of information pertaining to the class of objects having the thermal characteristics may thereby be mitigated as the dynamic range is reduced. At least a portion of the redistributed thermal image data pertaining to the thermal characteristics of the class of objects may thereby be efficiently presented in the thermal image.

The thermal characteristic may be a thermal range or thermal value. In other words, a temperature or a temperature range pertaining to the object of interest may thereby be used as a base for the redistribution function. Thus, a simple and efficient method is provided which may enhance local contrast in a thermal image for a class of objects based on their thermal emission.

The redistribution function may be centered at or at a predetermined offset to the thermal range or the thermal value. The redistribution of the thermal image data may thereby be efficiently performed at the thermal range or the thermal value pertaining to the class of objects. The local contrast at or around the thermal range or the thermal value may thereby be enhanced for the class of objects.

Alternatively, the redistribution of the thermal image data may take into account a predetermined offset to the thermal range or the thermal value. A change in the environment such as a change in weather which may affect the perceived temperature of the class of objects may thereby be taken into account. Hence, an enhanced local contrast at or around the thermal range may be obtained even if the environment at the scene is changed.

The redistribution function may be predetermined before acquiring of the thermal image data by the absolute calibrated thermal imaging system.

Hence, knowledge on the thermal characteristic for a class of objects, known prior to the acquiring of the thermal image, may be used for enhancing the local contrast in a thermal image for the class of objects. A simple and reliable method providing increased detectability for the class of objects in the thermal image may thereby be provided.

The redistribution function may be centered at or at an offset to the thermal range or the thermal value, wherein the centering or the offset is based on the first intensity distribution. The thermal emission from, for example, the background or objects within the first intensity distribution of the first thermal image may thereby be compensated for.

The thermal image data may be represented as a histogram.

The absolute calibration may be a temperature versus intensity calibration.

The redistribution function may be a histogram equalization function. The histogram equalization function may, for example, redistribute the thermal image data, i.e. pixel intensity values, evenly by using a cumulative, i.e. sum, histogram comprising the thermal image data and information pertaining to the thermal characteristics for forming a transfer function. The person skilled in the art realizes that the histogram equalization function may be of different forms.

The method may be performed before acquiring a consecutive thermal image to the first thermal image by the absolute calibrated thermal imaging system. The method thereby allows for real time imaging such as in a video stream.

According to a second aspect of the invention an apparatus is provided. The apparatus comprising a memory arranged to store thermal image data acquired by an absolute calibrated thermal imaging system, and store a predetermined redistribution function based on the thermal characteristic, a processor arranged to redistribute the thermal image data having a first intensity distribution into a second intensity distribution using the predetermined redistribution function such that the local contrast is enhanced for the class of objects.

The processor may further be arranged to output the redistributed thermal image data as the thermal image.

The apparatus may further comprise a thermal sensor.

The function and benefits of the apparatus are described above in relation to the method. The above mentioned features, when applicable, apply to this second aspect as well. In order to avoid undue repetition, reference is made to the above.

It is noted that the invention relates to all possible combinations of features recited in the claims.

BRIEF DESCRIPTION OF THE DRAWINGS

These and other aspects of the present invention are now described in more detail, with reference to the appended drawings showing embodiments of the invention. As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 4:
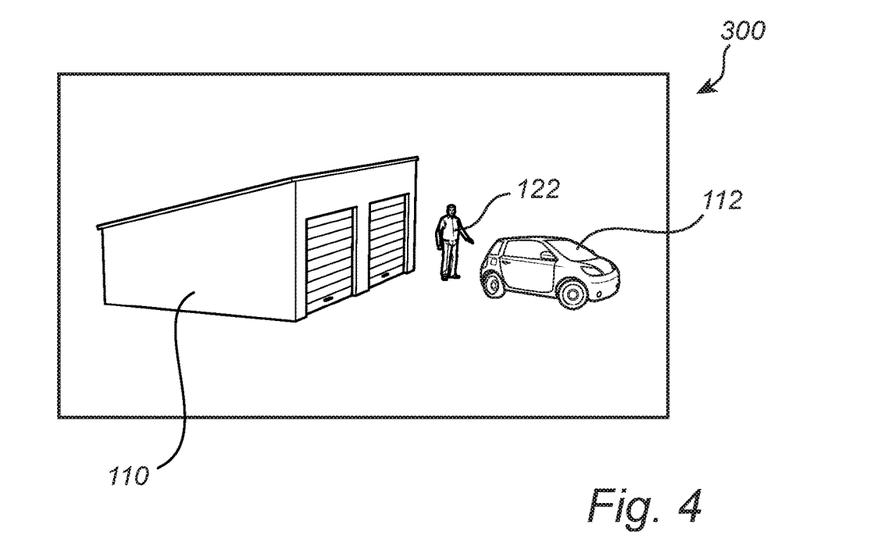
FIG. 4 illustrates another thermal image of the scene pertaining to the redistributed thermal image data.
Figure 5:
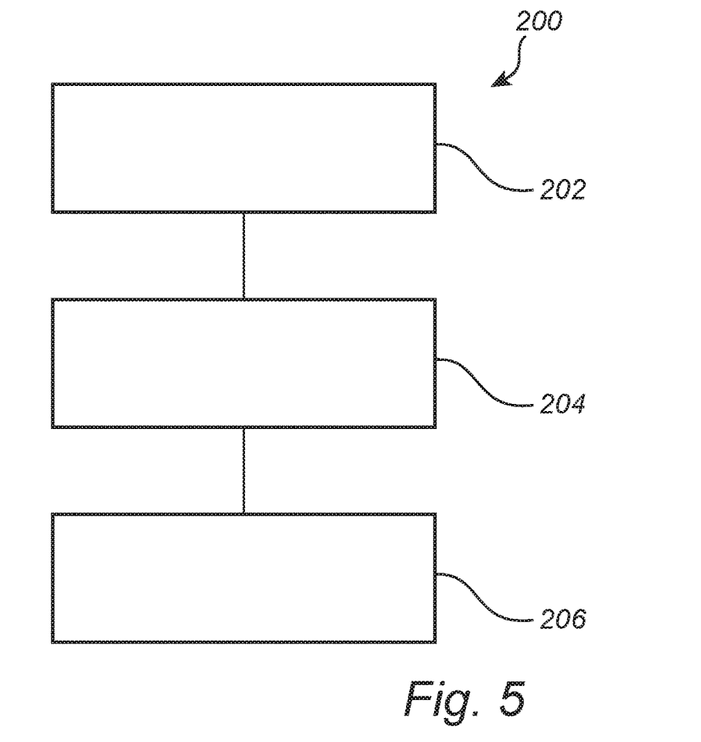
FIG. 5 illustrates method for enhancing local contrast in a thermal image for a class of objects having a thermal characteristic.

An object of the following description is to illustrate a method 200, see FIG. 5, for enhancing local contrast in a thermal image for a class of objects having a thermal characteristic. More specifically, the method 200 allows for improved detection and identification of e.g. humans within a thermal image 100, as illustrated with reference to FIGS. 1-4.

Figure 1:
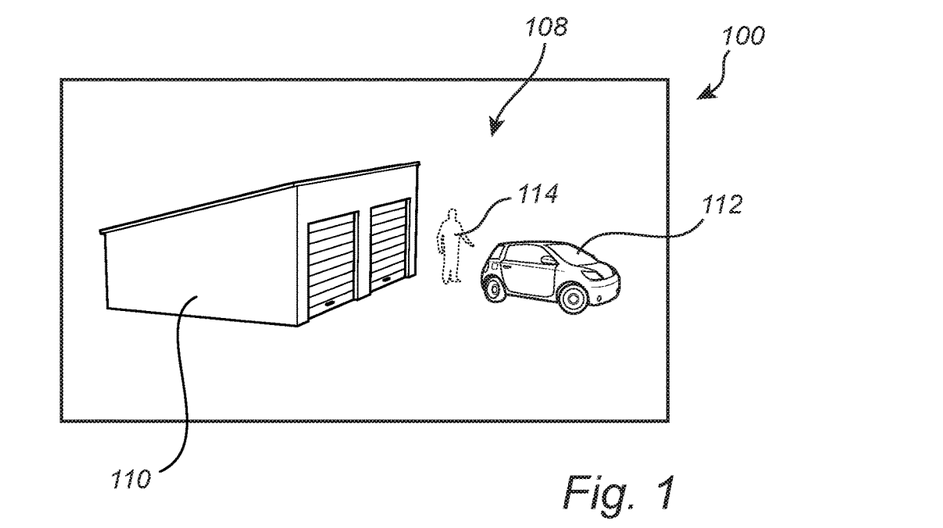
FIG. 1 illustrates a thermal image of a scene.

A thermal image 100 of a scene acquired with a thermal imaging system is illustrated in FIG. 1. The thermal image 100 is a digital image. The thermal image 100 shows a scene in which a plurality of objects 108 may be detected, as exemplified by garage 110 and a car 112. The class of objects 114 is, in this example, humans. To this end, an object 114 further appears in the thermal image 100, but it may not to be clearly identifiable from the thermal image 100. The object 114 may, however, for a viewer of the thermal image resemble a human and for illustrative purpose the object 114 is illustrated as a human having a dashed outline.

It should be noted that the class of objects may in other embodiments be animals, vehicles, buildings etc or certain unique objects such as the face of a human or parts of a vehicle. To this end, the thermal characteristic should in this example be understood as an intensity of thermal emission pertaining to the body temperature of a human. The thermal characteristics may be the body temperature of a human. The body temperature of a human may for example range from 36.5-37.5° C. The skin temperature of a human is, however, lower and clothing further reduces the intensity of the thermal radiation emitted. Hence, the thermal radiation from a human may be in the range of 30-35° C. depending for instance on weather conditions and/or clothing.

Figure 2:
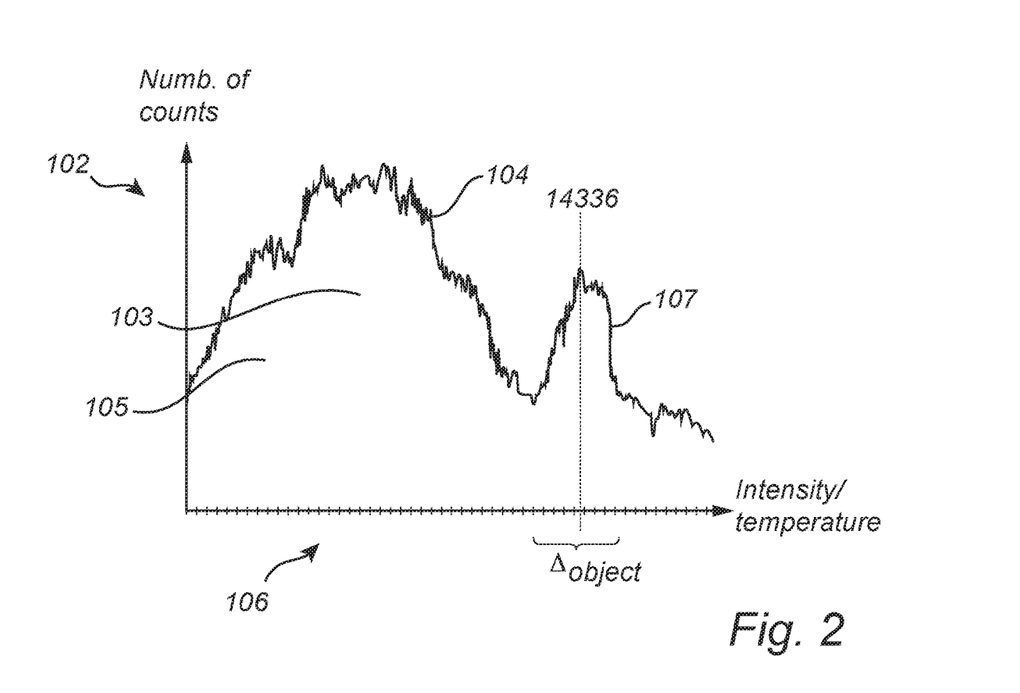
FIG. 2 illustrates thermal image data forming the thermal image of FIG. 1 in the form of a histogram.

The method 200, comprises the action of providing 202 thermal image data 102 acquired by an absolute calibrated thermal imaging system. FIG. 2 illustrates the thermal image data 102 from which the thermal image 100 is formed. The thermal image data has a first intensity distribution 103. The thermal image data 102 is shown as a histogram 104, the histogram 104 displaying the number of data points, also referred to as counts, in the thermal image data 102 having a certain detected intensity within the detection range of the thermal image system.

The number of data points may, for example, be the same as the number of pixels within the thermal image 100 having a detected intensity with a given intensity. The plurality of pixels may in other embodiments be binned.

The dynamic range is here to be understood a ratio between the largest and smallest possible intensity values detected by the thermal image system. The dynamic range of the thermal image system may be set by the range of intensities which may be detected by the thermal imaging system. The dynamic ratio may further be divided into a plurality of levels 106. In the thermal image 100, the levels 106 may correspond to different values of a grayscale.

The thermal image 100 and/or the histogram 104 may comprise the full dynamic range or a portion of the dynamic range. The levels 100 may further be binned such that a plurality of intensity values may fall within a level 106. To this end, the minimum level, e.g. 1, may correspond to the color black, the maximum level, e.g. 16384, to white, and intermediate levels may correspond to different shades of gray. The dynamic range is in the following 14 bits, corresponding to 16384 levels 106. The dynamic range may, however, differ in other embodiments. The dynamic range may, for example, comprise 12 or 8 bits corresponding to 4096 or 256 levels, respectively.

Again referring to FIG. 2, the first intensity distribution 103 of the thermal image data 102 comprises a broad peak 105 at lower intensities corresponding to the thermal emission from a plurality of sources within the scene. A narrow peak 107 may further be seen in the first intensity distribution 103 at higher intensities within the dynamic range. The narrow peak 107 thereby corresponds to thermal emission from sources within the scene having higher temperatures that the majority of sources.

In the following, the method 200 is applied to the thermal image data 102 to achieve improved detection and identification of humans which may be present in the thermal image 100. The method 200 relies on the insight that objects of interest in a thermal image 100 may have a certain thermal characteristic and that the thermal characteristic may be used as a base for redistributing the contents of the thermal image such that the local contrast may thereby be enhanced for the class objects. Based on this insight, the method 200 comprises the action of redistributing 204 of the thermal image data 102 having the first intensity distribution 103 into a second intensity distribution 118, as exemplified in FIG. 3, based on the thermal characteristic. More specifically, the redistributing 204 of the thermal image data 102 is achieved using a predetermined redistribution function being based on the thermal characteristic. Hence, information pertaining to the thermal characteristic may be used to form the predetermined redistribution function. The redistribution function may, for example, be a histogram equalization function as will be described further below.

The thermal characteristic may be understood as a known emission of thermal radiation pertaining to a given class of objects. For a human the thermal characteristic may be a thermal range or thermal value pertaining to the body temperature of the human. The thermal range and the thermal value may, for example, be 30-35° C. or 35° C., respectively.

The method 200 further takes advantage of the absolute calibrated thermal imaging system which provided that a given temperature of an object 108 within a scene may be correlated to a given intensity of thermal emission within the thermal image data 102. A simple correspondence between detected thermal radiation and temperature may be provided by using an absolute calibration of the thermal image system. A known temperature, such as the thermal characteristics of a human, thereby translates to a given value or interval of values, i.e. level or range of levels, within the dynamic range of the thermal image data 102.

Levels corresponding to a thermal range for a human are illustrated in FIG. 2 by $\Delta_{object}$, corresponding to a temperature range of 30-35° C. being characteristic for a human. This temperature range results in a centering of the range $\Delta_{object}$ at the level 14336 for a certain set of parameters for the thermal imaging system used. The level 14336 occurs near to the upper limit of the 14-bit dynamic range.

Figure 3:
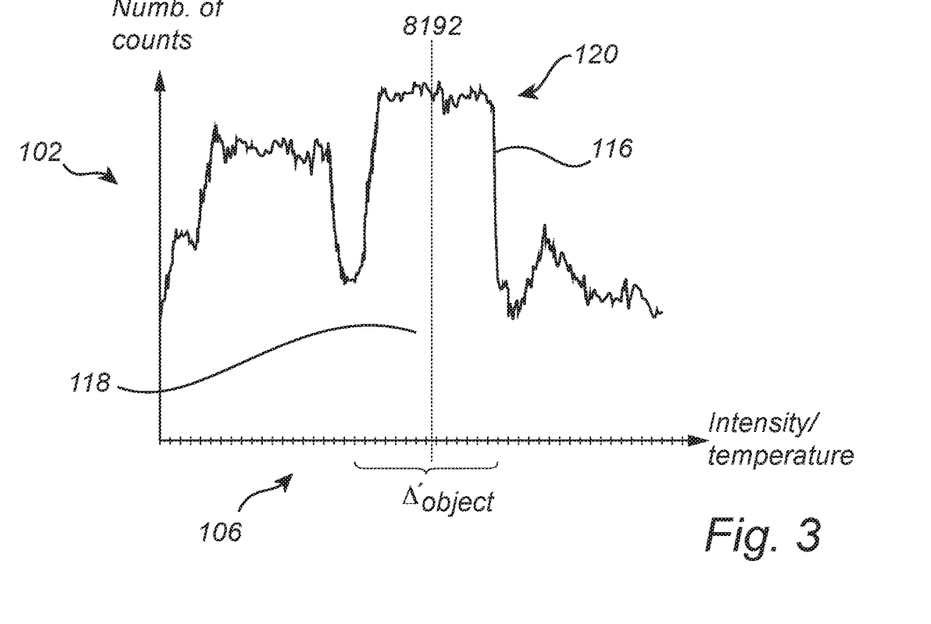
FIG. 3 illustrates the thermal image data in the form of a second histogram after redistributing the thermal image data.

FIG. 3 illustrates the thermal image data 102 in the form of a second histogram 116, the thermal image data 102 having the second intensity distribution 118. The thermal image data 102 have now been redistributed by applying a predetermined redistribution function to the thermal image data 102 such that the distribution of counts at given intensity levels is changed. The thermal image data 102 of the second histogram 116 is thereby shifted such that the range of levels $\Delta'_{object}$ of the second intensity distribution 118, corresponding to the temperature range of 30-35° C., is now centered at level 8192. Hence, the thermal image data may be modified such that the local contrast is enhanced for the class of objects having the thermal characteristic by redistributing the thermal image data 102. In other words, the portion 107 of the thermal image data pertaining to the class of objects is moved to the centre of the dynamic range of the thermal image system. An improved detection of the object of interest may thereby be achieved.

The predetermined redistribution function may further stretch the thermal image data such that the thermal range is distributed over a larger number of levels $\Delta'_{object}$, i.e. $\Delta'_{object} > \Delta_{object}$. Features 120 corresponding to local variations in intensity, i.e. temperature, for the class of objects may thereby be resolved. Hence, the local contrast is enhanced within a portion of the thermal image pertaining to the class of objects.

By redistributing the thermal image data based on the thermal characteristics, e.g. the thermal emission from a human, the relevant temperature range, e.g. 30-35° C., is present in the redistributed thermal images whereas other temperature ranges which may not be of interest, such as the temperature of the sky or a field in a scene, may be removed. Hence enhancement of details in and close to the thermal characteristics of a human may be obtained which increases the possibilities to detect and identify a human and its behavior in a scene.

The method 200 further comprises outputting 206 the redistributed thermal image data 102 as a thermal image 300. The thermal image 300 is illustrated in FIG. 4. The thermal image 300 shows the same scene as in FIG. 1. The plurality of objects 108 may still be detected, as exemplified by the garage 110 and the car 112. As a result of the method 200, the object 114 now appears in the thermal image 300 as a human, illustrated by the full lines outlining the human 122. Individual features of the human 122 may further be identified. By comparing the thermal image 100 and the thermal image 300 it is thus illustrated that the redistributing of the thermal image data 102, as provided by the method 200, has enhanced the local contrast for humans, i.e. for the desired class of objects 114. The enhanced local contrast allows for improved detection and/or identification of an object which may improve classification of the object. Tools, weapons and other objects carried by a person may further be identified easier by improving the local contrast.

In the above example, the method 200 was applied to the thermal image data 102 after providing the thermal image 100 of FIG. 1. It should be, however, be noted that the method 200 may be applied to the thermal image data 102 before providing a thermal image 100. Hence, the redistributed thermal image data 102 may be outputted as the thermal image 300 in which the local contrast for the class of objects is enhanced without previously providing any previous thermal image.

The method 200 was further disclosed in relation to thermal images. The method may in other embodiments be applied to thermal video. Hence, the redistribution 204 may be made automatic such that the method 200 is performed in real time.

The predetermined redistribution function may, as discussed above, be centered at a thermal range or a thermal value.

The thermal value may correspond to the body temperature $T_H$ of a human. $T_H$ may for example be 30 or 35° C. The thermal range may, for example, be $T_H - 1.8 \Delta T \leq T_H \leq T_H + 0.5 \Delta T$, where $\Delta T = 2° C$.

Alternatively the predetermined redistribution function may be centered at a predetermined offset to the thermal range or the thermal value. A change in the environment such as a change in weather conditions which may affect the intensity at which the thermal emission is detected. Hence, a shift in perceived temperature of a class of objects may be taken into account. An enhanced local contrast at or around the thermal range may thereby be obtained even if the environment at the scene is changed. The shift in temperature may for example be ±2° C.

The redistribution function may further be centered at or at an offset to the thermal range or the thermal value, wherein the centering or the offset is based on the first intensity distribution. The thermal emission from, for example, the background or objects within the first intensity distribution of the first thermal image may thereby be taken into account such that the contrast for the class of objects is optimized.

According to some embodiments the maximum and the minimum thermal emission values detected by the thermal imaging system may be used to set the dynamic range. Hence, the thermal image data may be distributed over the dynamic range. The thermal image data may further be centered such that the thermal range or thermal value pertaining to the thermal characteristics is at the centre of the dynamic range. For a dynamic range of 14-bit, the centering may be at the level 8192 of the dynamic range.

The redistribution function may be a multi peak function such that different portions, i.e. ranges of levels, of the thermal image data are shifted and/or redistributed to different extents. Hence, the redistribution function may affect different ranges or values within the dynamic range differently. Assuming, as an example, that a scene comprises a dominating thermal emission corresponding to temperatures of 18-24° C., thermal emission from objects having temperatures within 30-38° C., and a background thermal emission below 18° C. The dynamic range of the absolute calibrated thermal imaging system is assumed to be 14 bit.

With an object to detect and identify a human with the scene the method 200 described above may be used. The function may then be based on the known thermal emission from the face of a human. In other words, the thermal characteristics may be a temperature of 34° C., i.e. within the temperature range 30-38° C. discussed above. The function may further be arranged such that the temperature range 18-24° C. is distributed over the levels 1-8192 of the dynamic range. The range 30-38° C. may further be distributed over the levels 10240-14336, and the range 24-30° C. over the levels at 8192-10240. The thermal emission below 18° C. may further be discarded, i.e. will not be represented in the thermal image provided by the method 200. The function thereby provides a distribution of the thermal image data in which the weight at the interval 24-30° C. is reduced, whereas the weight at the range 30-38° C. is increased. An enhanced local contrast for objects within the range 30-38° C. is thereby improved which improves the detection and/or identification of humans based on their body temperature. A simple and reliable method providing increased detectability for the class of objects in the thermal image may thereby be provided.

The redistribution function may be a histogram equalization function. The skilled person in the art realizes that the histogram equalization function may be of different forms. The histogram equalization function may for example comprise non-linear and non-monotonic transfer functions to map thermal image data having a first distribution to thermal data having a second distribution. Hence, the histogram equalization function may redistribute the intensity distribution of the thermal image data, e.g. the intensity corresponding to intensity values of the pixels for a thermal image, such that the representation of the thermal image data to be outputted as a thermal image contains a more uniform distribution of pixel intensities, i.e. having a broader distribution of intensity values in the histogram for a class of objects. The broader intensity distribution may for example form a substantially flat histogram, improving the local contrast for a temperature interval given by the thermal characteristic of the class of objects. In other words, the histogram equalization function may be seen as a detail enhancer for a class of objects based on the thermal characteristic.

In the above description the first and the second intensity distribution have been disclosed to have the same dynamic range. The first intensity distribution may alternatively have a first dynamic range and the second intensity distribution have a second dynamic range smaller than the first dynamic range. Hence, the redistributing 204 of the method 200 may further comprise altering the thermal image data such that the second intensity distribution is achieved. The thermal imaging system may for example acquire thermal images with 14-bit (16384 levels) of quantization of the thermal emission detected and digitized. Hence, a grayscale image having a dynamic range of 16384 levels may be provided. The dynamic range may for example be reduced to for instance 255 gray levels allowed in an 8-bit image or video format.

The altering of the thermal image data may be performed after that the thermal image data have been redistributed. Loss of information pertaining to the class of objects having the thermal characteristics may thereby be mitigated.

Figure 6:
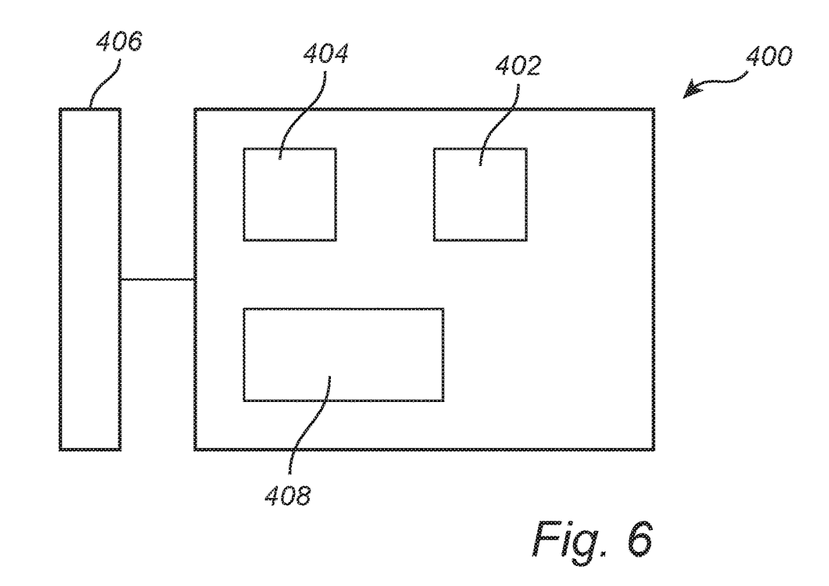
FIG. 6 illustrates apparatus for enhancing local contrast in a thermal image.

In the following an apparatus 400 for enhancing local contrast in a thermal image for a class of objects having a thermal characteristic is disclosed. The apparatus 400 comprises a memory 402 arranged to store thermal image data acquired by an absolute calibrated thermal imaging system. The memory 402 is further arranged to store a predetermined redistribution function based on the thermal characteristic. The apparatus 400 further comprises a processor 404 arranged to redistribute the thermal image data having a first intensity distribution into a second intensity distribution using the predetermined redistribution function such that the local contrast is enhanced for the class of objects. The processor 404 is further arranged to output the redistributed thermal image data as the thermal image.

Thermal emission is radiation of electromagnetic waves having wavelengths of 1-10 000 μm. Hence, the thermal emission from an object may be in the infrared, IR, of part of the electromagnetic spectrum. The thermal emission may further be in the near IR range of around 0.7-1.5 μm, the mid-wave IR, MWIR, of about 3-5 μm, in the long-wavelength IR, LWIR of 8-14 μm.

The apparatus may further comprise a thermal sensor 406 arranged to convert thermal emission into electrical signals from which thermal image data may be provided. The thermal sensor may be a cooled thermal sensor typically operating in the MWIR range or a non-cooled thermal sensor typically operating in the LWIR range.

The thermal sensor 404 may form part of a thermal camera. The thermal camera may further be a network thermal camera.

The apparatus 400 may further comprise an encoder 408 such as an ARTPEC 4. The apparatus may thereby provide compression of data streams comprising for example thermal image data. The apparatus 400 may further provide compression providing video streams in H.264, MPEG-4, and Motion JPEG.

The function and benefits of the apparatus 400 are the same as described above in relation to the method 200. Hence, the above mentioned features, when applicable, apply to also to the apparatus 400.

The person skilled in the art realizes that the present invention by no means is limited to the preferred embodiments described above. On the contrary, many modifications and variations are possible within the scope of the appended claims. For example, the plurality of levels of the dynamic ratio may correspond to different values of a pseudo-color scale or a color scale. Each color or nuance may represent a different temperature, usually white and red for higher temperatures, over green, blue and violet for colder ones.

Additionally, variations to the disclosed embodiments can be understood and effected by the skilled person in practicing the claimed invention, from a study of the drawings, the disclosure, and the appended claims. The word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A method for enhancing local contrast in a thermal image, the method comprising:
    acquiring, from an absolute calibrated thermal imaging system, thermal image data representing a first thermal image;
    detecting one or more objects in the first thermal image based on thermal characteristics that comprise a known emission of thermal radiation for a class of objects, wherein the class of objects is associated with a predetermined redistribution function arranged to enhance local contrast within a portion of the thermal image pertaining to the class of objects;
    selecting the predetermined redistribution function for the one or more objects based on the known emission of thermal radiation of the class of objects;
    generating a new enhanced thermal image by redistributing the thermal image data having a first intensity distribution into a second intensity distribution using the selected predetermined redistribution function, wherein the new enhanced thermal image has enhanced local contrast in the portion of the thermal image pertaining to the class of objects; and
    outputting the new enhanced thermal image.

2. The method according to claim 1, wherein the absolute calibrated thermal imaging system has a dynamic range, wherein the thermal characteristics of the class of objects include a given level or range of levels, corresponding to a thermal range, within the dynamic range, and
    wherein the predetermined redistribution function:
    a) adjusts a portion of the thermal image data containing a particular object to a centre of the dynamic range of the thermal image system.

3. The method according to claim 1, wherein the first intensity distribution has a first dynamic range and wherein the redistributing further comprises altering the thermal image data such that the second intensity distribution has a second dynamic range smaller than the first dynamic range.

4. The method according claim 3, wherein the altering of the thermal image data is performed after that the thermal image data have been redistributed.

5. The method according to claim 1, wherein the thermal characteristics include a thermal range or thermal value.

6. The method according to claim 5, wherein the predetermined redistribution function is centered at the thermal range or the thermal value.

7. The method according to claim 5, wherein the predetermined-redistribution function is centered at or the thermal range or the thermal value, wherein the centering is based on the first intensity distribution.

8. The method according to claim 1, wherein the thermal image data is represented as a histogram.

9. The method according to claim 1, wherein the absolute calibrated thermal imaging system is calibrated using a temperature versus intensity calibration.

10. The method according to claim 1, wherein the redistribution function is a histogram equalization function.

11. The method according to claim 1, wherein the method is performed before acquiring a consecutive thermal image to the first thermal image by the absolute calibrated thermal imaging system.

12. An apparatus for producing enhanced thermal images, the apparatus comprising:
a calibrated thermal imaging system;
a memory that stores a plurality of predefined redistribution functions, wherein the plurality of stored predefined redistribution functions are based on a known emission of thermal radiation for a class of objects; and
a processor communicatively coupled to the memory and the absolute calibrated thermal imaging system;
wherein the processor:
acquires, from the absolute calibrated thermal imaging system, thermal image data representing a first thermal image;
detects one or more objects in the first thermal image based on thermal characteristics that comprise the known emission of thermal radiation for a class of objects, wherein the class of objects is associated with a predetermined redistribution function arranged to enhance local contrast within a portion of the thermal image pertaining to the class of objects;
selects a predetermined redistribution function from the plurality of stored redistribution functions for the one or more objects based on the known emission of thermal radiation of the class of objects;
generates a new enhanced thermal image by redistributing the thermal image data having a first intensity distribution into a second intensity distribution using the selected predetermined redistribution function, wherein the new enhanced thermal image has enhanced local contrast in the portion of the thermal image pertaining to the class of objects; and
outputs the new enhanced thermal image.

13. The apparatus according to claim 12, wherein the predetermined redistribution function is a histogram equalization function.

14. The method according to claim 5, wherein the predetermined redistribution function is centered at a predetermined offset to the thermal range or the thermal value.

15. The method according to claim 5, wherein the predetermined redistribution function is centered at an offset to the thermal range or the thermal value, wherein the centering or the offset is based on the first intensity distribution.

16. The method according to claim 1, wherein the predetermined redistribution function is determined by:
selecting, based on an object identified in the first image, a particular redistribution function from a plurality of redistribution functions stored in a memory, wherein the particular redistribution function enhances contrast between the object and a remainder of the first image.

17. The apparatus according to claim 12, wherein the predetermined redistribution function is determined by:
selecting, based on an object identified in the first image, a particular redistribution function from the plurality of redistribution functions stored in a memory, wherein the particular redistribution function enhances contrast between the object and a remainder of the first image.

18. The method according to claim 1, wherein the absolute calibrated thermal imaging system has a dynamic range, wherein the thermal characteristics of the class of objects include a given level or range of levels, corresponding to a thermal range, within the dynamic range, and
wherein the predetermined redistribution function:
distributes the thermal range pertaining to the particular object over a larger number of levels, such that a local contrast is enhanced for a portion of the first thermal image containing the particular object.

* * * * *